United States Patent
Martin et al.

(10) Patent No.: US 8,882,237 B2
(45) Date of Patent: Nov. 11, 2014

(54) PRINTHEAD APPARATUS, PRINTER SYSTEM AND METHOD OF PRINTHEAD BUILT-IN TEST

(75) Inventors: Eric T. Martin, Corvallis, OR (US); Adam L. Ghozeil, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/978,915

(22) PCT Filed: Jan. 25, 2011

(86) PCT No.: PCT/US2011/022469
§ 371 (c)(1),
(2), (4) Date: Jul. 10, 2013

(87) PCT Pub. No.: WO2012/102709
PCT Pub. Date: Aug. 2, 2012

(65) Prior Publication Data
US 2013/0293623 A1    Nov. 7, 2013

(51) Int. Cl.
*B41J 29/393*    (2006.01)
*G06K 15/02*    (2006.01)

(52) U.S. Cl.
CPC ........... *B41J 29/393* (2013.01); *G06K 15/1894* (2013.01)
USPC ......................................................... 347/19

(58) Field of Classification Search
CPC .. B41J 29/393; B41J 2/04505; B41J 2/04541; B41J 2/04573; B41J 2/0451; G06K 15/1894
USPC ......................................... 347/5, 9, 14, 15, 19
See application file for complete search history.

(56) References Cited

U.S. PATENT DOCUMENTS

| | | | |
|---|---|---|---|
| 5,414,381 A | 5/1995 | Nelson et al. | |
| 6,217,144 B1 | 4/2001 | Myung | |
| 6,641,243 B2 | 11/2003 | Anderson et al. | |
| 6,726,298 B2 | 4/2004 | Anderson et al. | |
| 7,019,866 B1 | 3/2006 | Beck et al. | |
| 7,572,051 B2 | 8/2009 | Limb et al. | |
| 2007/0002087 A1 | 1/2007 | Matsui et al. | |
| 2007/0024668 A1 | 2/2007 | Folkins | |
| 2007/0081842 A1 | 4/2007 | Ehrhardt, Jr. et al. | |
| 2007/0285454 A1 | 12/2007 | Shang et al. | |
| 2008/0001979 A1 | 1/2008 | Kasai et al. | |
| 2010/0053295 A1 | 3/2010 | Muraki et al. | |

*Primary Examiner* — An Do

(57) ABSTRACT

A printhead apparatus, an inkjet printer system, and a method of built-in test employ a test flag transmitted through a data channel of a printhead. The apparatus includes a plurality of printheads, a data register at each printhead, and a status channel. Each printhead has a unidirectional data channel (UDC) to provide data to the printhead. The data register detects proper reception of a test flag received by the printhead through the UDC. The status channel reports printhead status information including whether or not proper reception of the test flag was detected by the data register. The system includes the apparatus and a controller to generate the test flag and receive the printhead status information. The method includes sending a test flag, and verifying proper reception thereof.

15 Claims, 3 Drawing Sheets

PRINTHEAD APPARATUS, PRINTER SYSTEM AND METHOD OF PRINTHEAD BUILT-IN TEST

CROSS-REFERENCE TO RELATED APPLICATIONS

N/A

STATEMENT REGARDING FEDERALLY SPONSORED RESEARCH OR DEVELOPMENT

N/A

BACKGROUND

Inkjet printers and related inkjet devices have proven to be reliable, efficient, and generally cost effective means for the accurate delivery of precisely controlled amounts of ink and other related liquid materials onto various substrates such as, but not limited to, glass, paper, cloth, transparencies and related polymer films. For example, modern inkjet printers for consumer market digital printing on paper offer printing resolutions in excess of 2400 dots per inch (DPI), provide printing speeds greater than 60 sheets per minute, and deliver individual droplets of ink in a 'drop-on-demand' method that are often measured in picoliters. The relatively low costs, high print quality and generally vivid color output provided by these modern inkjet printers has made these printers among the most common digital printers in the consumer market.

Currently, in addition to the consumer market, there is considerable interest in employing inkjet printing for high-speed commercial and industrial applications. Among the chief challenges of the high-speed commercial and industrial printing markets are high throughput, large format substrates, and high reliability (or a related parameter, high duty cycle). Such high-speed commercial and industrial inkjet printers often employ multiple printheads working in parallel. The multiple printheads are often arranged in an array and may be implemented as a print bar that spans a width of the print substrate, for example.

High-speed commercial and industrial applications often demand high-speed data channels for communicating print data to the printheads. For example, data rates in excess of hundreds of megahertz (MHz) to one or more gigahertz (GHz) may be used. With the use of such high-speed data channels, there is typically a need for verifying a performance of the high-speed data channels. In addition, the high-speed nature of, and more particularly high clock frequencies used in conjunction with, the high-speed data channels may place tight constraints on data timing within and between the printheads of the printer. As such, there is also often a need for calibrating and potentially adjusting time delays associated with the high-speed data channels to insure that data sent to the printheads is received properly.

Unfortunately, economic pressure to generally lower costs of printheads in these high-speed commercial and industrial inkjet printers typically leads to a reduction in a number of input and output (I/O) connections at the printheads. Reducing I/O connections usually means a reduction in or even complete elimination of I/O connections dedicated to testing the printheads.

BRIEF DESCRIPTION OF THE DRAWINGS

The various features of examples may be more readily understood with reference to the following detailed description taken in conjunction with the accompanying drawings, where like reference numerals designate like structural elements, and in which.

Certain examples have other features that are one of in addition to and in lieu of the features illustrated in the above-referenced figures. These and other features are detailed below with reference to the preceding drawings.

DETAILED DESCRIPTION

Examples in accordance with the principles described herein provide one or both of built-in test and calibration of data channels used to transmit data to a plurality of printheads of a printer. In particular, examples herein provide one or both of built-in test and calibration without requiring any dedicated input/output (I/O) lines. Instead, built-in test and calibration of the data channels are provided using communication channels that are employed for normal data communication when the printheads are in operation. The built-in test may verify that a data channel of a given printhead is operating within predefined parameters. Calibration facilitates determining a data channel-specific time delay that allows for proper reception of print data. While described in terms of inkjet printers, the principles described herein may be generally applicable to a wide variety of printers that employ a plurality of printheads.

Further, as used herein, the article 'a' is intended to have its ordinary meaning in the patent arts, namely 'one or more'. For example, 'a printhead' means one or more printheads and as such, 'the printhead' means 'the printhead(s)' herein. Also, any reference herein to 'top', 'bottom', 'upper', 'lower', 'up', 'down', 'front', 'back', 'left' or 'right' is not intended to be a limitation herein. Herein, the term 'about' when applied to a value generally means plus or minus 10% unless otherwise expressly specified. Moreover, examples herein are intended to be illustrative only and are presented for discussion purposes and not by way of limitation.

Figure 1:
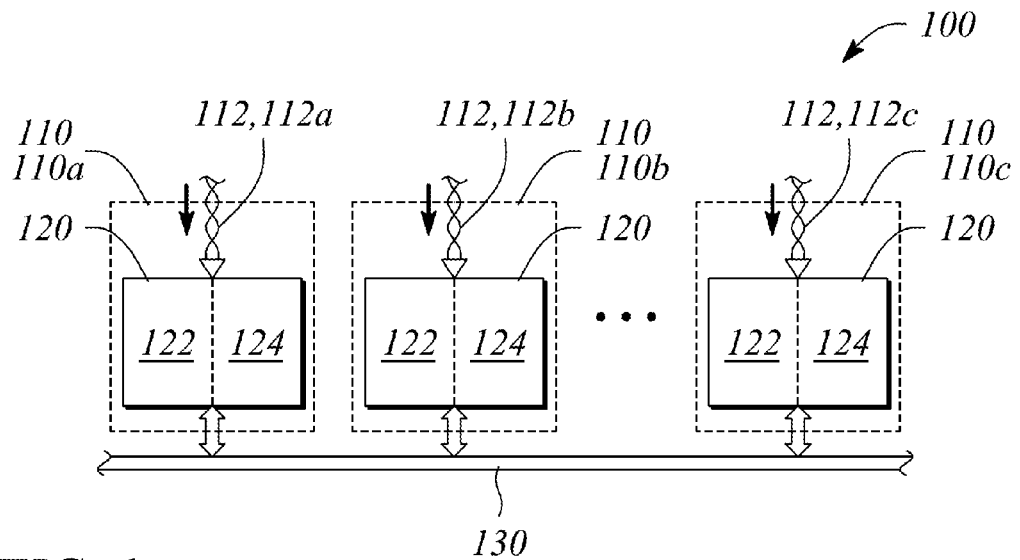
FIG. 1 illustrates a block diagram of a printhead apparatus, according to an example of the principles described herein.

FIG. 1 illustrates a block diagram of a printhead apparatus 100, according to an example of the principles described herein. The printhead apparatus 100 provides one or both of built-in test and calibration, for example. Built-in test may verify operation of a data channel that provides data (e.g., print data) to the printhead apparatus 100. Calibration may facilitate setting a variable time delay of the data channel. Setting the variable time delay may provide that nominal performance of the printhead apparatus 100 is achieved, for example.

In some examples, the printhead apparatus 100 may provide built-in test and calibration to a plurality of printheads arranged as a page-wide array, for example. The variable time delay set by calibration may compensate for a printhead-specific transmission time delay of the data channel, according to some examples. An example of a page-wide array is a print bar along which the printheads are arranged in a spaced apart manner. The printhead apparatus 100 may be part of an inkjet printer or an inkjet printer system, according to some examples.

The printhead apparatus 100 comprises a plurality of printheads 110. The printheads 110 may be inkjet printheads, for example. In another example, the printheads 110 may represent a printhead of another type of printer. Each printhead 110 of the plurality has a data channel 112. The data channel 112 provides data (e.g., print data, one or more test flags, etc.) to the printhead 110.

The data channel 112 is dedicated to the printhead 110, in some examples. In other words, each printhead 110 of the plurality has a separate and unique data channel 112, according to some examples. For example, as illustrated in FIG. 1 a printhead 110a has a data channel 112a, printhead 110b has a data channel 112b, a printhead 110c has a data channel 112c and so on. In some examples, the data channel 112 is a unidirectional data channel (UDC) 112 configured to carry or transmit data in only one direction (e.g., to the printhead 110). Data being carried to the printheads 110 on the UDC 112 is illustrated in FIG. 1 by a heavy arrow.

In some examples, the UDC 112 employs low voltage differential signaling (LVDS) to transmit data to the printheads 110. In conjunction with the UDC 112, LVDS employs a differential driver to drive a pair of transmission lines (e.g., twisted-pair wires) at relatively low differential voltages (e.g., a common-mode voltage of about 1.2 volts, typical) and at relatively small current levels (e.g., 3.5 mA), for example. Data is transmitted on the transmission line encoded as a pair of different voltages. The encoded data is received by a differential receiver that compares the two different voltages and recovers the encoded data from a voltage difference between the transmission lines. LVDS may provide relative high data rates (e.g., greater than 1.5 GB/s) with low power dissipation, less electro-magnetic interference (EMI), less susceptibility to EMI from other sources, and at relatively low costs. A standard that defines a physical layer that may be used to implement a generic LVDS electronic interface is ANSI/TIA/EIA-644-A published by the American National Standards Institute (ANSI) as standards from the Telecommunications Industry Association (TIA), an offshoot of the Electronic Industry Association (EIA). However, other implementations are possible and are within the scope described herein.

In some examples, the UDC 112 has a variable time delay. The variable time delay is configured to allow a delay of reception of data carried by the UDC 112 to be varied relative to a master clock. In some examples, the master clock is shared by the printheads 110. In particular, the UDC 112 may incorporate means for variably delaying a signal carried by the UDC 112 relative to the master clock. For example, a circuit may be provided at a transmitting end of the UDC 112 that delays transmission of data on the UDC 112 by an amount dictated by the variable time delay. The circuit may be implemented as an application specific integrated circuit (ASIC), for example. In another example, the delay in transmission may be implemented in software executed by a processor (e.g., a microprocessor) that produces and provides the data. In yet another example, a variable time delay mechanism may be built into the transmission structures of the UDC 112. For example, the UDC 112 may incorporate a switched delay line to implement the variable time delay.

In some examples, a value of the variable time delay may be adjusted or selected to calibrate the UDC 112. For example, the data may comprise one or more test flags and the value may be selected to calibrate reception of the test flag(s) at a time delay between a minimum delay and a maximum delay. By definition herein, the 'minimum delay' is a time delay below which proper reception of the test flag is no longer provided. Likewise by definition, the maximum delay is a time delay above which proper reception is no longer provided. Hence, the minimum delay and maximum delay define a time delay window that provides proper reception of the test flag, by definition.

In some examples, the value of the variable time delay is set to be within the time delay window (i.e., between the minimum delay and the maximum delay). In some examples, the value of the variable time delay is selected to be a mean time delay between the minimum delay and the maximum delay. In yet other examples, the value may be selected to be closer to the minimum delay than the maximum delay. In still other examples, the value may be selected to be closer to the maximum delay than the minimum delay. A decision on what value to select may be determined by a sensitivity of the printhead apparatus 100 to one or both of the minimum delay and the maximum delay, for example. The minimum delay may be more sensitive to temperature fluctuations and so the value may be chosen to be closer to the maximum delay to avoid this sort of sensitivity, for example.

In general, the selected value of the variable time delay is unique to each printhead 110 of the plurality. In particular, each UDC 112 may have a different selected value of the variable time delay. As such, a calibration operation that selects the variable time delay value may be performed for each of the printheads 110 and the associated UDC 112 of the printhead apparatus 100.

The printhead apparatus 100 further comprises a data register 120 at each printhead 110. For example, the data register 120 may be implemented in an integrated circuit of each printhead 110. In another example, a separate circuit may implement the data register 120. The separate circuit would be matched or otherwise directly associated with a printhead 110 so that each printhead 110 had an associated data register 120. In yet another example, the data register 120 may be implemented as a bank or group of registers with individual resisters of the group being assigned to individual printheads 110. In still other examples, the data register 120 may be implemented as software register or firmware register in a microcontroller (not illustrated) of the printhead apparatus 100. Again the software register or the firmware register would provide individual printheads 110 with individual data registers 120.

The data register 120 is configured to receive a test flag, in some examples. The test flag is transmitted to the printhead 110 through the UDC 112 of the printhead 110. The data register 120 is further configured to detect whether or not the test flag is received properly. For example, the data register 120 may compare the test flag, as received, to a stored image or template of the test flag. The comparison may be performed using logic gates, for example. The logic gates may be implemented in an ASIC or in one or both of software and firmware, for example. In another example, the data register 120 is a shift register and the comparison is performed as a function of shifts by the shift register. In this example, the data register 120 receives an indication that proper reception has occurred. A variety of other implementations are possible, all of which are within the scope described herein.

The data register 120 is further configured to store a result of the comparison or alternatively the indication of proper reception, for example. In particular, in some examples, proper reception of the test flag 'sets' the data register 120 while improper reception does not set the data register 120. In some examples, proper reception may 'clear' the data register 120. In some examples, the data register 120 may be cleared by another means other than improper reception.

For discussion purposes, by 'set' it is meant that a register stores a logic value corresponding to a binary '1', while by 'clear' or 'cleared', it is meant that a register stores a logic value corresponding to a binary '0'. However, the use of binary values of '0' and '1' is completely arbitrary and the meaning of 'set' and 'clear' may be reversed without departing from the scope described herein. As such, setting a cleared register or clearing a register that has previously been set results in a change of state of the register (i.e., set='0'→'1'; clear='1'→'0'). On the other hand, setting a set register or clearing a cleared register will not change the state of the register.

In some examples, the data register 120 comprises a first data register 122. The first data register 122 is configured to be set upon proper reception of the test flag. In some examples, the data register 120 further comprises a second data register 124. In some examples, the second data register 124 is configured to be cleared upon proper reception of the test flag. Herein, 'proper reception' is defined as receiving data (e.g., the test flag) or more generally a binary value that has the same meaning as the data or binary value that was sent or transmitted over a data channel. In other words, proper reception would constitute receiving a '1' if a binary value of '1' had been sent.

In some examples, the test flag comprises a first test flag and a second test flag. The first data register 122 may be configured to be set in response to proper reception of the first test flag, for example. In some examples the second data register 124 is configured to be cleared in response to proper reception of the first test flag. As such, proper reception of the first test flag sets the first data register 122 and clears the second data register 124. In various examples, improper reception of the first test flag may leave the states (e.g., binary states) of the first and second data registers 122, 124 unchanged. In some examples, the first data register 122 is configured to be cleared and the second data register 124 is configured to be set in response to proper reception of the second test flag. As with the first test flag, improper reception of the second test flag may result in no change in the state of the first and second data registers 122, 124, for example.

As illustrated in FIG. 1, the printhead apparatus 100 further comprises a status channel 130. The status channel 130 is configured to report printhead status information. In various examples, the printhead status information comprises whether or not proper reception of the test flag was detected by the data register 120. In some embodiments, the status channel 130 is a common status channel that is shared by the plurality of printheads 110 of the printhead apparatus 100. In some examples, the status channel 130 is a serial data channel. In some examples, the status channel 130 is a bi-directional data channel. In some examples, the bi-directional data channel comprises a relatively low-speed and low-cost communications bus when compared to the UDC 112. In other examples, the status channel 130 is a unidirectional data channel. Proper reception of the test flag(s) reported by the status channel indicates passage of a built-in test for the UDC 112 of the printhead 110.

Figure 2:
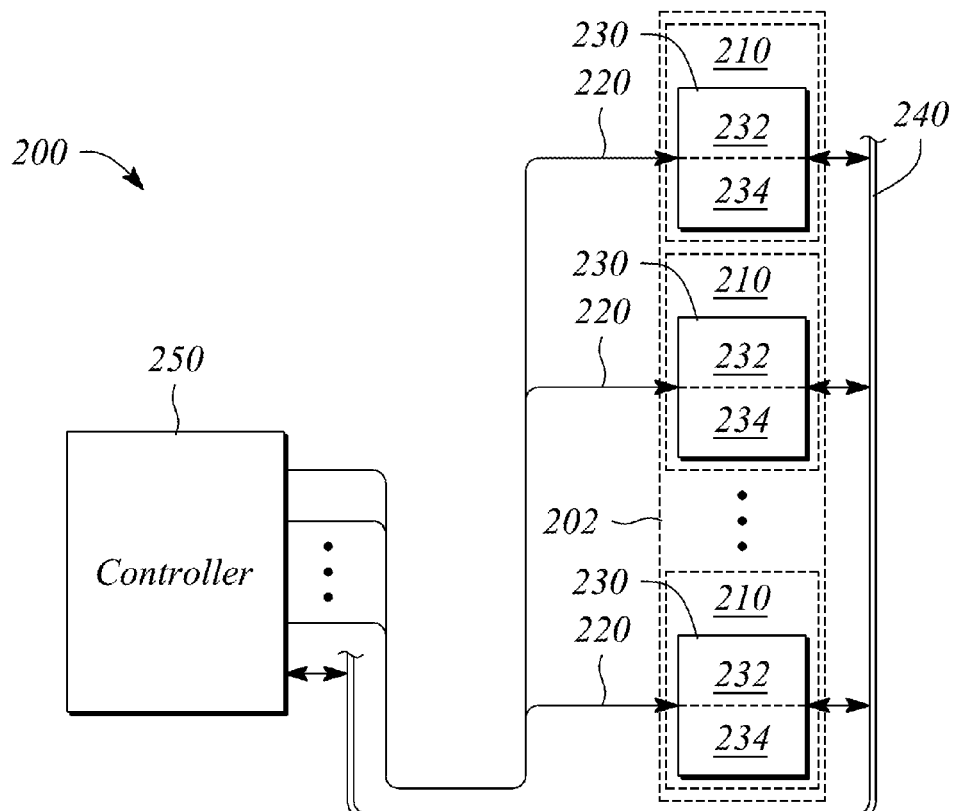
FIG. 2 illustrates a block diagram of an inkjet printer system, according to examples of the principles described herein.

FIG. 2 illustrates a block diagram of an inkjet printer system 200, according to examples of the principles described herein. For example, the inkjet printer system 200 may be an industrial inkjet printer with a page-wide print bar 202. The page-wide print bar facilitates printing a strip or swath across an entire width of a page or other substrate within moving the print bar, for example.

As illustrated, the inkjet printer system 200 comprises a plurality of printheads 210. The printheads 210 print one or more dots in response to print data received by the printhead 210. The printheads 210 may be arranged as an array spaced apart along the print bar 202, for example. In some examples, the printheads 210 are substantially similar to the printheads 110, described above with respect to the printhead apparatus 100.

The inkjet printer system 200 further comprises a plurality of unidirectional data channels (UDCs) 220. Each UDC 220 is connected to a different one of the printheads 210. The UDCs 220 are configured to provide data to the printheads 210. The data may comprise print data, for example. In addition, the data may further comprise a test flag or a sequence of test flags. In some examples, the UDC 220 is substantially similar to the data channel or UDC 112, described above with respect to the printhead apparatus 100.

In particular, in some examples, the UDCs 220 have variable time delays relative to a master clock provided to the printheads 210 of the plurality. The variable time delay facilitates introduction of a time delay in the reception of the data (e.g., test flag) by respective printheads 210 that is variable relative to the master clock. For example, the variable time delay may be selected to calibrate reception of the data at a time delay between a minimum delay that provides proper reception and a maximum delay that provides proper reception. Proper reception may be determined using test flags, for example. In some examples, the variable time delay may be substantially similar to the variable time delay described above with respect to the printhead apparatus 100. For example, the test flag may comprise a first test flag and a second test flag, as described above.

In some examples, each printhead 210 may benefit from a uniquely determined time delay, as described above. In particular, a time delay for a printhead 210 of the plurality may differ from respective time delays for other printheads 210. In some examples, the difference in time delays may be due to a differential distance between individual printheads 210 of the plurality and a source of data transmitted to the printheads 210 through the UDCs 220 (e.g., by a controller 250, described below). The uniquely determined time delay may be a particular time delay provided by the variable time delay that calibrates reception of the test flag at each individual printhead 210, for example.

The inkjet printer system 200 further comprises a data register 230 at each printhead 210. The data register 230 is configured to detect proper reception of the test flag received by the printhead 210 through the connected UDC 220. Detecting proper reception may include storing an indication of proper reception, for example. In some examples, the data register 230 is substantially similar to the data register 120, described above with respect to the printhead apparatus 100.

In particular, according to some examples, the data register 230 at each printhead 210 comprises a first data register 232 and a second data register 234 to detect proper reception of the test flag. In some examples, the test flag comprises a first test flag and a second test flag. The first data register 232 may be set and the second data register 234 may be cleared in response to proper reception of the first test flag. Moreover, the first data register 232 may be cleared and the second data register 234 may be set in response to proper reception of the second test flag.

As illustrated, the inkjet printer 200 further comprises a status channel 240. The status channel 240 may be a bi-directional data channel, for example. In some examples, the status channel 240 is a serial data channel. In some examples, the status channel 230 is a relatively slower speed and potentially lower-cost data channel when compared to the UDCs 220. The status channel 240 carries printhead status information. The printhead status information comprises whether or not proper reception of the test flag was detected at the data register. In examples that include two data registers, the printhead status information may include indications of proper reception by both data registers. In some examples, the status channel 240 is substantially similar to the status channel 130 describe above with respect to the printhead apparatus 100. In some examples, the status channel 240 may be used for controlling other settings on and communication with print heads 210 where high data rates are not required, for example.

The inkjet printer 200 may further comprise a controller 250. The controller 250 generates print data that is transmitted to the printheads 210 through the connected UDCs 220. The controller 250 also generates the test flag(s) as well as print data on the UDCs 220. In addition, the controller 250 receives the reported printhead status information from the printheads 210 through the status channel 240. The controller 250 may be microprocessor or a combination of a microprocessor and other circuitry (e.g., time delays) implemented as an ASIC, for example. In some examples, the controller 250 may provide the master clock. In some examples, the controller 250 controls the time delays of the various UDCs 220.

Figure 3:
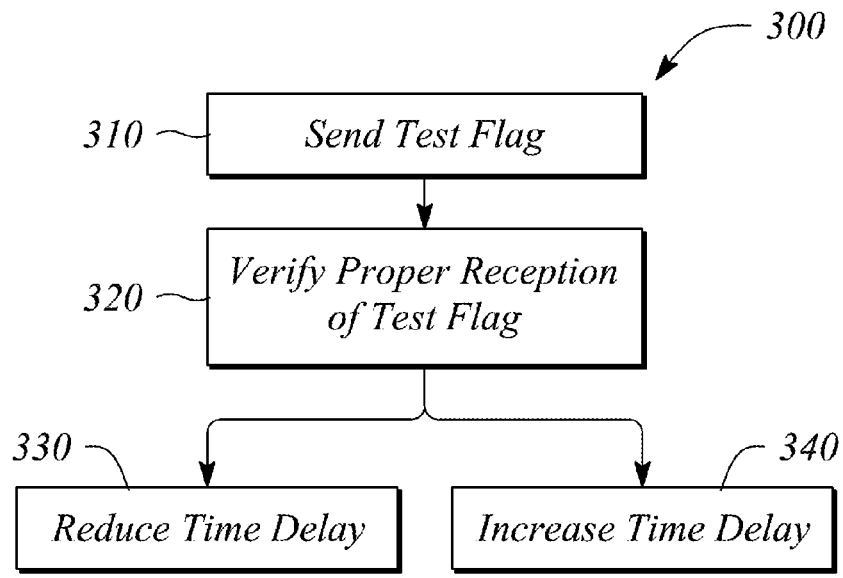
FIG. 3 illustrates a flow chart of a method of printhead built-in test, according to examples of principles described herein.

FIG. 3 illustrates a flow chart of a method 300 of printhead built-in test, according to examples of principles described herein. The method 300 of printhead built-in test comprises sending 310 a test flag to a printhead of a plurality of printheads. The printhead may be a printhead of an inkjet printer, for example. Further, the plurality of printheads may be arranged and spaced apart along a print bar of the inkjet printer, for example.

The test flag is sent to the printhead through a data channel. In some examples, the data channel is one or both of unidirectional and dedicated to the printhead. For example, the data channel may be substantially similar to either of the UDC 112 or the UDC 220, described above. Moreover, the data channel may be a low voltage differential signaling (LVDS) data channel, for example. An initial time delay of the data channel may be selected to be in a nominal range for the data channel, for example.

The method 300 of printhead built-in test further comprises verifying 320 proper reception of the test flag at the printhead. Verifying 320 proper reception employs a status channel that is separate from the data channel. In some examples, the status channel is shared by the plurality of printheads. Verification 320 of proper reception establishes that the unidirectional data channel is operational according to the printhead built-in test of method 300. According to some examples, the status channel receives an indication of proper receipt of the test flag from a data register or data registers of the printhead. In some examples, the status channel is substantially similar to the status channel 130 described above with respect to the printhead apparatus 100. In some examples, the data register is substantially similar to the data register 120 described above with respect to the printhead apparatus 100.

In some examples, the method 300 of built-in test also provides means for calibrating a time delay of the unidirectional data channel. According to these examples, the method 300 of built-in test further comprises reducing 330 a time delay of the data channel of the printhead. The method 300 then further comprises performing sending 310 the test flag and verifying 320 proper reception of the test flag. In particular, after reducing 330 the time delay, the test flag is sent 310 to the printhead using the unidirectional data channel. The time delay may be reduced 330 by a fraction of an expected range of the time delay, for example. The data register at the printhead determines whether the test flag was received properly. Proper reception is then verified 320 by checking an output of the data register using the status channel. The process of reducing 330 the time delay followed by performing sending 310 the test flag and verifying 320 proper reception of the test flag is repeated until the printhead no longer properly receives the test flag. A minimum time delay for the data channel is determined as the time delay at which proper reception is no longer achieved.

In some examples, the method 300 of built-in test used as means for calibrating a time delay further comprises increasing 340 a time delay of the data channel of the printhead. The method 300 then further comprises performing sending 310 the test flag and verifying 320 proper reception of the test flag. In particular, after increasing 340 the time delay, the test flag is sent 310 to the printhead using the unidirectional data channel. The data register at the printhead determines whether the test flag was received properly. Proper reception is then verified 320 by checking an output of the data register using the status channel. The process of increasing 340 the time delay followed by performing sending 310 the test flag and verifying 320 proper reception of the test flag is repeated until the printhead no longer properly receives the test flag. A maximum time delay for the data channel is determined as the time delay at which proper reception is no longer achieved.

According some examples, the repeated process of reducing 330 the time delay, sending 310 a test flag and verifying 320 proper reception of the test flag may begin at the nominal time delay of the data channel, for example. Moreover, for example, the repeated process of increasing 340 the time delay, sending 310 a test flag and verifying 320 proper reception of the test flag may begin at the nominal time delay. Alternatively, in some examples, the repeated process of reducing 330 the time delay, sending 310 a test flag and verifying 320 proper reception of the test flag may begin at or in a vicinity of the maximum time delay. In these examples, the maximum time delay is determined before the minimum time delay is determined. Likewise, the repeated process that determines the maximum delay may begin at or in a vicinity of the minimum time delay (e.g., assuming that the minimum time delay is already determined).

In some examples, the test flag comprises a first test flag and a second test flag, as has been discussed above. Moreover, as has been discussed, the data register may comprise a first data register and a second data register, in some examples. In these examples, proper reception of the first test flag may set the first data register and clear the second data register. Similarly, proper reception of the second test flag may clear the first data register and set the second data register.

Figure 4:
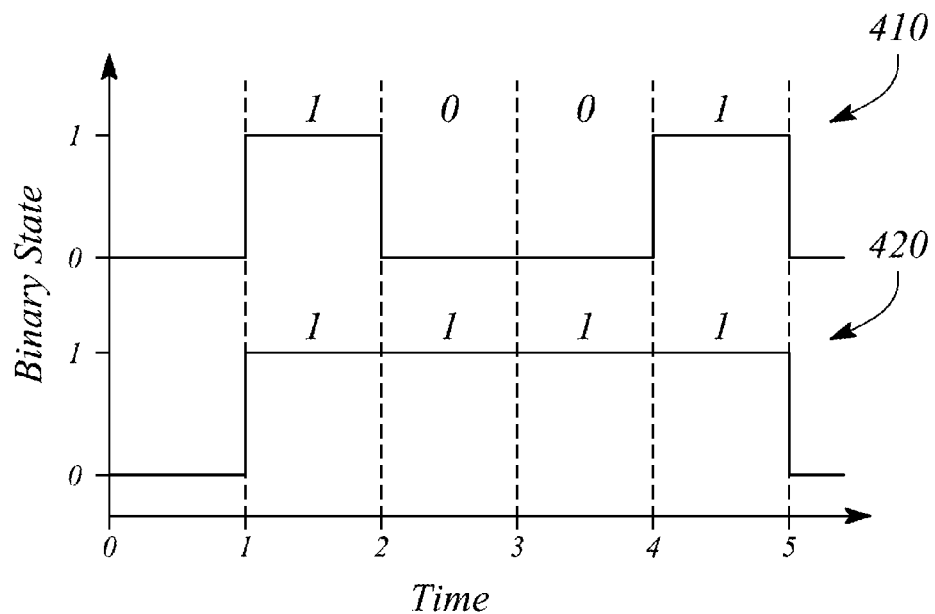
FIG. 4 illustrates a graph of waveforms representative of an example first test flag and an example second test flag, according to examples of the principles described herein.

FIG. 4 illustrates a graph of waveforms representative of an example first test flag 410 and an example second test flag 420, according to examples of the principles described herein. In particular, a first waveform 410 illustrates the example first test flag 410 while a second waveform 420 illustrates the example second test flag 420. The example first test flag 410, as illustrated, may represent a binary sequence [1001], for example. The example second test flag 420, as illustrated, may represent a binary sequence [1111]. In some examples, the first and second test flag waveforms 410, 420 may be sent to the printheads over the data channels in place of a normal data sequence that provides print data to the printheads, for example.

The test flag(s) may be distinguished from normal print data by the unique binary sequences that define the test flags. In particular, normal data may be preceded by a 'start' binary sequence that is distinct from the test flags. For example, a binary sequence of [101] may be used as the start binary sequence. The start binary sequence [101] is clearly not found in either of the binary sequences of the example first test flag 410 or the example second test flag 420, for example. Further, once a start binary sequence is received by the printhead(s), all of the data registers may be reset or cleared and all data following the start binary sequence (including data that may mimic a test flag) is assumed to be print data until all print data is sent (e.g., a predetermined data frame is completed).

Figure 5:
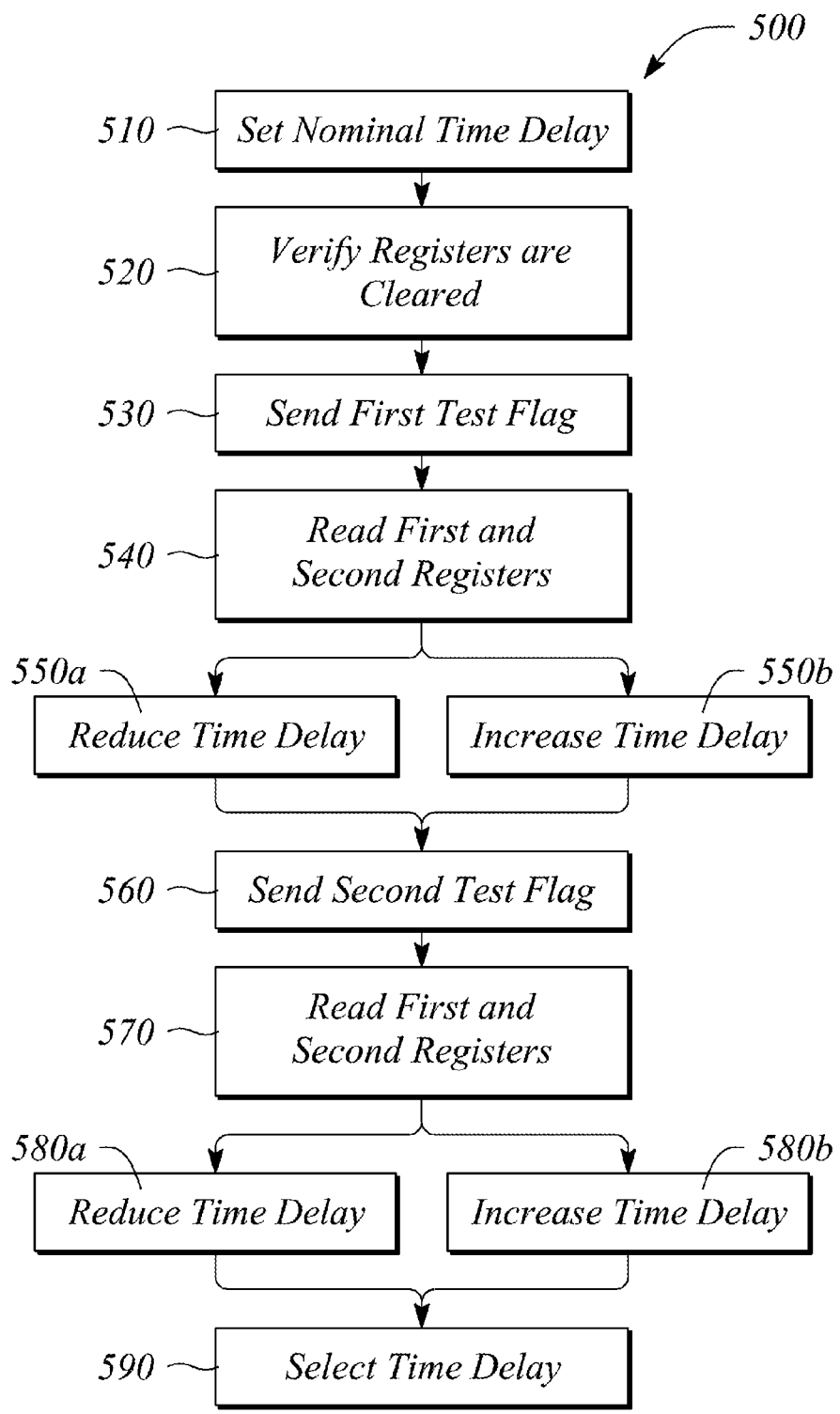
FIG. 5 illustrates a flow chart of a method of calibration, according to examples of the principles described herein.

Referring back to the method 300 of built-in test and to examples that employ a first test flag and a second test flag, the method 300 of built-in test may be expanded to be another method of calibration that also provides built-in test. FIG. 5 illustrates a flow chart of a method 500 of calibration, according to examples of the principles described herein. In particular, the method 500 of calibration may be viewed as an expanded version of the method 300 of built-in test that employs two test flags and two data registers. As such, the discussion above with respect to the method 300 of built-in test may apply equally well to the method 500 of calibration. Further, since iterations of the method 500 of calibration verify an operation of the data channel to the printhead, the method 500 of calibration also represents means for providing built-in test.

The method 500 of calibration comprises setting 510 a time delay of the data channel to a nominal value (e.g., between an expected minimum value and an expected maximum value). The method 500 of calibration further comprises verifying 520 that the first and second data registers are cleared (i.e., in a reset or '0' state) and if not, clearing the first and second registers. One or both of verifying 520 and clearing the first and second registers may be performed using the status channel, for example.

The method 500 of calibration further comprises sending 530 the first test flag through the data channel. The first test flag is received by the first and second data registers. Proper reception of the first test flag sets the first data register and clears the second data register. Sending 530 the first test flag may be substantially similar to sending 310 the test flag (albeit with the first test flag) described above with respect to the method 300 of built-in test, according to some examples.

The method 500 of calibration further comprises reading 540 the first and second data registers using the status channel. Reading 540 the first and second registers indicates proper reception of the first test flag if the first data register is set and the second data register is cleared. Reading 540 the first and second registers is substantially similar to verifying 320 proper reception of the test flag (albeit with the first test flag and two data registers).

In some examples, the method 500 of calibration further comprises reducing 550a the time delay of the data channel when determining a minimum delay time. In other examples, the method 500 of calibration further comprises increasing 550b the time delay of the data channel when determining a maximum delay time. Reducing 550a the time delay and increasing 550b the time delay are substantially similar to reducing 330 the time delay and increasing 340 the time delay, respectively, described above with respect to method 300 of built-in test, according to some examples.

The method 500 of calibration further comprises sending 560 a second test flag through the data channel. As described above with respect to the first test flag, the second test flag is received by the first and second data registers. However, proper reception of the second test flag clears the first data register and sets the second data register. Sending 560 the second test flag may be substantially similar to sending 310 the test flag (albeit with the second test flag) described above with respect to method 300 of built-in test, according to some examples.

The method 500 of calibration further comprises reading 570 the first and second data registers using the status channel. Reading 570 the first and second data registers indicates proper reception of the second test flag if the first data register is cleared and the second data register is set. Reading 570 the first and second data registers is substantially similar to verifying 320 proper reception of the test flag (albeit with the second test flag and two data registers).

The method 500 of calibration further comprises further reducing 580a the time delay of the data channel when determining a minimum delay time and the second test flag has been sent 560. The method 500 of calibration further comprises further increasing 580b the time delay of the data channel when determining a maximum delay time and the second test flag has been sent 560. For example, further reducing 580a the time delay and further increasing 580b the time delay may be substantially similar to reducing 550a the time delay and increasing 550b the time delay, respectively, when the first flag was sent 530.

When determining the minimum time delay, the process blocks 530-580a may be repeated in some examples. In particular, the process comprising sending 530 the first test flag, reading 540 the first and second data registers, reducing 550a the time delay, sending 560 the second test flag, reading 570 the first and second data registers, and further reducing 580a the time delay may be repeated until one or both of the first and second test flags is not received properly. For example, if at either process block 540 or 570 of reading the first and second data registers, one or both of the first and second data registers is found to be in an incorrect state (i.e., set when it should be cleared or cleared when it should be set) then it may be concluded that the test flag was not received properly. A current time delay when improper reception of the test flag is detected is taken to be the determined minimum time delay for the channel. In general, each data channel will have a different determined minimum time delay.

Moreover, when determining the minimum time delay, the process blocks 530-580b may be repeated in some examples. In particular, the process comprising sending 530 the first test flag, reading 540 the first and second data registers, increasing 550b the time delay, sending 560 the second test flag, reading 570 the first and second data registers, and further increasing 580b the time delay may be repeated until one or both of the first and second test flags is not received properly. A current time delay when improper reception of the test flag is detected is taken to be the determined maximum time delay for the channel. In general, each data channel will have a different determined maximum time delay.

The method 500 of calibrating further comprises selecting 590 a time delay for the channel. For example, a time delay between the determined minimum time delay and the determined maximum time delay is selected 590. The goal is to select 590 a time delay that places data transitions on the data channel in or close to a middle of a setup and hold window of receivers in the printheads. Selecting 590 such a time delay may facilitate proper reception of data including, but not limited to, the test flag(s), by the printheads. In some examples, selecting 590 a time delay employs a mean value between the determined minimum time delay and the determined maximum time delay.

As indicated above, the method 500 of calibrating may be performed on all data channel—printhead pairs of the plurality of printheads. In some examples, the method 500 of calibrating is performed during a manufacturing and test process. For example, the method 500 of calibrating is performed to establish values of various time delays of an inkjet printer with a print bar comprising the plurality of printheads prior to shipping the inkjet printer. In some examples, the method 500 of calibrating is also performed periodically throughout the life of a printer that incorporates the plurality of printheads. For example, the method 500 of calibrating may be performed during a startup sequence when the printer is first turned on. In another example, the method 500 of calibrating may be performed once every week, month, or another predetermined interval. In yet another example, the method 500 of calibrating may be initiated as part of a built-in test mode of the printer.

Thus, there have been described examples of a printhead apparatus, an inkjet printer system, and methods of built-in test and calibration that employ a test flag transmitted through a data channel of a printhead. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A printhead apparatus with built-in test comprising:
a plurality of printheads, each printhead having a unidirectional data channel (UDC) to provide data to the printhead;
a data register at each printhead to detect proper reception of a test flag received by the printhead through the UDC; and
a status channel to report printhead status information comprising whether or not proper reception of the test flag was detected by the data register.

2. The printhead apparatus of claim 1, wherein proper reception of the test flag reported by the status channel indicates passage of a built-in test for the UDC of the printhead.

3. A printhead apparatus of claim 1, wherein the UDC of each printhead has a variable time delay, the variable delay to allow a time delay of the reception of the test flag to be varied relative to a master clock that is shared by the printheads.

4. The printhead apparatus of claim 3, wherein a value of the variable time delay is selected to calibrate reception of the test flag at a mean time delay value between a minimum delay that provides proper reception and a maximum delay that provides proper reception, the selection being unique to each printhead of the plurality.

5. The printhead apparatus of claim 1, wherein the data register at each printhead comprises a first data register and a second data register to detect proper reception of the test flag, the first data register being set and the second data register being cleared in response to proper reception of the test flag.

6. The printhead apparatus of claim 5, wherein the test flag comprises a first test flag and a second test flag, and wherein proper reception of the first test flag sets the first data register and clears the second data register, and proper reception of the second test flag clears the first data register and sets the second data register.

7. The printhead apparatus of claim 1, wherein the printheads of the plurality are arranged and spaced apart along a print bar.

8. A printer comprising the printhead apparatus with built-in test of claim 1, the printer further comprising:
a controller to generate and transmit the test flag through the UDCs of the plurality of printheads and to receive from the status channel the reported printhead status information.

9. An inkjet printer system comprising:
a plurality of printheads;
a plurality of unidirectional data channels (UDCs), each UDC being connected to a different one of the printheads to provide data to the printhead;
a data register at each printhead to detect proper reception of a test flag received by the printhead through the connected UDC;
a status channel to report printhead status information comprising whether or not proper reception of the test flag was detected by the data register, and
a controller to generate the test flag and receive the reported printhead status information.

10. The inkjet printer system of claim 9, wherein the UDCs have variable time delays relative to a master clock provided to the printheads of the plurality, the variable time delay to allow a delay of the reception of the test flag by respective printheads to be varied relative to the master clock, the variable delay being selected to calibrate reception of the test flag at a time delay between a minimum delay that provides proper reception and a maximum delay that provides proper reception.

11. The inkjet printer system of claim 9, wherein the data register at each printhead comprises a first data register and a second data register to detect proper reception of the test flag, and wherein the test flag comprises a first test flag and a second test flag, the first data register being set and the second data register being cleared in response to proper reception of the first test flag, the first data register being cleared and the second data register being set in response to proper reception of the second test flag.

12. A method of printhead built-in test, the method comprising:
sending a test flag to a printhead of a plurality of printheads, the test flag being sent to the printhead through a data channel that is unidirectional; and
verifying proper reception of the test flag at the printhead using a status channel that is separate from the data channel, the status channel being shared by the plurality of printheads.

13. The method of printhead built-in test of claim 12, further comprising:
reducing a time delay of the data channel of the printhead; and
repeating the sending a test flag and the verifying proper reception after the reducing a time delay,
wherein the reducing a time delay followed by the repeating the sending and the verifying are repeated until both the printhead no longer properly receives the test flag and a minimum time delay for the data channel is determined.

14. The method of printhead built-in test of claim 12, further comprising:
increasing a time delay of the data channel of a printhead; and
repeating the sending a test flag and the verifying proper reception after the increasing a time delay,
wherein the increasing a time delay followed by the repeating the sending and the verifying are repeated until both the printhead no longer properly receives the test flag and a maximum delay for the data channel is determined.

15. The method of printhead built-in test of claim 12, wherein the test flag comprises:
a first test flag to set a first data register and to clear a second data register in the printhead; and
a second test flag to set the second data register and to clear the first data register,
wherein respective ones of setting and clearing occur only upon the respective test flags being properly received at the printhead.

* * * * *